US012793347B2

(12) United States Patent
Valkonen

(10) Patent No.: US 12,793,347 B2
(45) Date of Patent: Nov. 10, 2026

(54) AUGMENTED VIRTUAL TOUR

(71) Applicant: P2 Holding Oy, Jyväskylä (FI)

(72) Inventor: Mika Valkonen, Äänekoski (FI)

(73) Assignee: P2 Holding Oy, Jyväskylä (FI)

( * ) Notice: Subject to any disclaimer, the term of this patent is extended or adjusted under 35 U.S.C. 154(b) by 143 days.

(21) Appl. No.: 18/276,679

(22) PCT Filed: Feb. 11, 2022

(86) PCT No.: PCT/FI2022/050085
§ 371 (c)(1),
(2) Date: Aug. 10, 2023

(87) PCT Pub. No.: WO2022/175589
PCT Pub. Date: Aug. 25, 2022

(65) Prior Publication Data

US 2024/0104852 A1 Mar. 28, 2024

(30) Foreign Application Priority Data

Feb. 17, 2021 (FI) ..................................... 20215160

(51) Int. Cl.
*G06T 19/00* (2011.01)
*G06F 3/16* (2006.01)

(52) U.S. Cl.
CPC ............ *G06T 19/003* (2013.01); *G06F 3/165* (2013.01); *G06T 19/006* (2013.01)

(58) Field of Classification Search
CPC ... G06T 19/003; G06T 19/006; G06T 15/205; G06T 19/20; G06F 3/165; G05B 23/0216;
(Continued)

(56) References Cited

U.S. PATENT DOCUMENTS 6,987,545 B1 * 1/2006 Klein ..................... H04N 19/42 348/718
10,777,015 B2 9/2020 Anderson et al.
(Continued)

FOREIGN PATENT DOCUMENTS

CN 211207134 U 8/2020
JP 2019510321 A 4/2019
JP 2020036081 A 3/2020

OTHER PUBLICATIONS

Kachach, Redouane, et al. "Virtual tour: An immersive low cost telepresence system." 2020 IEEE conference on virtual reality and 3D user interfaces abstracts and workshops (VRW). IEEE, 2020. (Year: 2020).*

(Continued)

*Primary Examiner* — Daniel F Hajnik
(74) *Attorney, Agent, or Firm* — Ziegler IP Law Group, LLC.

(57) ABSTRACT

A computer implemented method includes obtaining a previously captured virtual tour data of a location, receiving real-time image data of a target object located in the location, overlaying the real-time image data on an area of a virtual tour view for forming a mixed image virtual tour data, receiving real-time acoustic data captured by an audio sensor in the location, and playing the real-time acoustic data when the user moving through the mixed image virtual tour is in a certain predetermined distance from the audio sensor. The disclosure further relates to a system for performing the method and a computer program product including instructions to perform the method.

13 Claims, 8 Drawing Sheets

(58) Field of Classification Search
CPC ... G05B 23/0283; H04R 29/004; H04N 5/272
See application file for complete search history.

(56) References Cited

U.S. PATENT DOCUMENTS

| | | | | |
|---|---|---|---|---|
| 11,778,427 | B2 * | 10/2023 | Chen | H04L 61/50 455/518 |
| 2004/0239699 | A1 | 12/2004 | Uyttendaele et al. | |
| 2016/0127690 | A1 * | 5/2016 | Kaehler | G06V 20/52 348/143 |
| 2016/0260253 | A1 * | 9/2016 | Reddy | G06T 15/205 |
| 2017/0287215 | A1 | 10/2017 | Lalonde et al. | |
| 2019/0266803 | A1 * | 8/2019 | Anderson | G06T 19/006 |
| 2019/0371062 | A1 | 12/2019 | Yang | |
| 2020/0322917 | A1 * | 10/2020 | Rosenberg | H04W 64/003 |

OTHER PUBLICATIONS

Cosgun, Akansel, Dinei A. Florencio, and Henrik I. Christensen. "Autonomous person following for telepresence robots." 2013 IEEE International Conference on Robotics and Automation. IEEE, 2013. (Year: 2013).*

Milosavljevic et al., "Integration of GIS and video surveillance", International Journal of Geographical Information Science, Mar. 14, 2016, 2090-2107, vol. 30, No. 10, ISSN: 1365-8816, http://dx.doi.org/10.1080/13658816.2016.1161197, 20 pages.

Harma et al., "Augmented Reality Audio for Mobile and Wearable Appliances", Journal of the Audio Engineering Society, Jun. 2004 vol. 52, No. 6, 23 pages.

Finnish Patent and Registration Office, Office Action, Application Number 20215160, mailed Nov. 9, 2021, 10 pages.

Sebe et al., "3D Video Surveillance with Augmented Virtual Environments", First ACM SIGMM international workshop Video surveillance, DOI: 10.1145/982452.982466, 6 pages.

Simsarian et al., "Windows on the World: An example of Augmented Virtuality", Presented at the Interfaces 97: Man-Machine Interaction, 7 pages.

Mattioli et al., "2D-3D Spatial Registration for Remote Inspection of Power Substations", energies, MDPI, Article, Published Nov. 25, 2020, 24 Pages.

Guennoun et al., "Augmented Reality-Based Audio/Visual Surveillance System", HAVE 2008—IEEE Internatioanl Workshop on Haptic Audio Visual Environments and theri Applications, Oct. 18-19, 2008, DOI: 10.1109/HAVE.4685301, 5 pages.

Milgram et al., "A Taxonomy of Mixed Reality Visual Displays", IEICE Transactions on Information Systems, vol. E77-D, No. 12, Dec. 1994, 15 pages.

Zollmann et al., "Augmented Reality for Construction Site Monitoring and Documentation", Proceedigns of the IEEE 2014, vol. 102, No. 2, 18 pages.

Finnish Patent and Registration Office, International Preliminary Report on Patentability, Application No. PCT/FI2022/050085, Date of Completion May 25, 2023, 44 pages.

Finnish Patent and Registration Office, Written Opinion of the International Searching Authority, Application No. PCT/FI2022/050085, mailed May 17, 2022, 9 pages.

Finnish Patent and Registration Office, Written Opinion of the International Preliminary Examining Authority, Application No. PCT/FI2022/050085, mailed Mar. 28, 2023, 8 pages.

Finnish Patent and Registration Office, International Search Report, Application No. PCT/ FI2022/050085, mailed May 17, 2022, 5 pages.

Berggren, Response to Written Opinion of the IPEA, Application No. PCT/FI2022/050085, 9 pages.

European Patent Office, Search Report, Application No/Patent No. 22755627.1-1207 / 4295315 PCT/FI2022050085, Dated Dec. 12, 2024, 10 Pages.

Japan Patent Office, Office Action, Application No. JP2023-549635, Issued Oct. 7, 2025, 3 pages, English Translation, 2 pages.

Ministry of Intellectual Property Office, Notice of Opinion, Application No. 10-2023-7029359, Mailed May 15, 2026, 6 pages.

* cited by examiner

AUGMENTED VIRTUAL TOUR

FIELD

The aspects of the disclosed embodiments relate to a computer implemented method for augmenting a virtual tour.

The aspects of the disclosed embodiments also relate to a system and a computer program product causing an apparatus to carry out the method.

BACKGROUND

In many environments, for example, in industrial environments and production plants, there are situations when there is a need to monitor process or environment, in order to identify, for example, changes or a developing fault. It is a predictive maintenance. The use of monitoring allows maintenance to be scheduled, or other actions to be taken to prevent consequential damages and avoid its consequences. However, industry is not the only environment that benefits from monitoring, also monitoring the condition or state of the buildings increases the peace of mind of the owner.

For example, in industrial environments, there are a number of different kinds of elements, features, or factors that need to be monitored. For example, in pulp and paper manufacturing process in the paper industry, the process must be monitored in order to detect possible disorders. In many cases, it is not always sufficient to monitor the situation by watching measuring readings or by monitoring image data generated by cameras from different parts of the manufacturing site on screen(s) or rely on analysis results of image processing devices, but the information can be more efficiently obtained when a professional person visits the manufacturing site to check the process, for example, condition of the meters, machines and other essential manufacturing parts. However, this is not always possible, for example, due to a location of a manufacturing site or recommended due to challenging conditions in a manufacturing site.

Another example of locations desired to be monitored are homes and holiday apartments. People want to monitor their buildings remotely, for example due to the malfunctions of household appliances, or due to possible open water taps or doors. In many cases, it is either not adequate to monitor the situation watching measuring device readings received through internet or to relay door opening information, but the desired information is more efficiently obtained when a person enters the building and checks the situation by him/herself. However, this is not always possible, for example, due to a location of a holiday apartment, ongoing trips or work.

GUENNOUN, M. et al. Augmented Reality-Based Audio/Visual Surveillance System, XP031365053, discloses an "instant" three-dimensional audio/visual-based surveillance system that is intended to provide surveillance capabilities over a large area using a large number of camera sensors.

SEBE, 1.0. et al. 3D video surveillance with Augmented Virtual Environments, XP058214676, discloses a visualization system for video surveillance based on an Augmented Virtual Environment (AVE) that fuses dynamic imagery with 3D models in a real-time display to help observers comprehend multiple streams of temporal data and imagery from arbitrary views of the scene.

SUMMARY

Now there has been invented an improved method and technical equipment implementing the method. Various aspects of the disclosed embodiments include a computer executable method, a camera system comprising at least one image sensor, and a computer readable medium comprising a computer program stored therein, which are characterized by what is stated in the independent claims. Various embodiments are disclosed in the dependent claims.

According to a first aspect of the disclosed embodiments, there is provided a computer implemented method, comprising obtaining a previously captured virtual tour data of a location, receiving real-time image data of a target object located within a field of view area of a camera, which target object is located in the same location wherein the virtual tour data was captured, and overlaying the real-time image data on an area of a virtual tour view for forming a mixed image virtual tour data, which area of the virtual tour view corresponds the field of view area.

According to an embodiment, the virtual tour data is static image data of a real environment of the location. According to an embodiment, the previously captured virtual tour data comprises images along a walk through the location, and which previously captured virtual tour data is obtained from a camera, a memory or a cloud storage, and wherein the method further comprises: constructing the obtained virtual tour data as a virtual tour by a data processing unit. According to an embodiment, the previously captured virtual tour data is a ready-constructed virtual tour. According to an embodiment, the method further comprises receiving real-time acoustic data captured by an audio sensor in the location and playing the acoustic data in an area of the mixed image virtual tour view corresponding the location of the audio sensor or its surroundings in the location. According to an embodiment, the method further comprises obtaining additional information about the location and overlaying the additional information on the mixed image virtual tour view. According to an embodiment, the real-time image data is real-time video stream or frequently captured real-time images. According to an embodiment, wherein the method further comprises capturing real-time image data to be overlayed on areas of the virtual tour view corresponding the field of view areas by more than one cameras. According to an embodiment, a time point of a view of the mixed image virtual tour is changeable to a previous time point.

According to a second aspect of the disclosed embodiments, there is provided a system comprising at least one camera and a data processing unit, wherein the data processing unit is configured to obtain a previously captured virtual tour data of a location and the at least one camera is configured to capture real-time image data of a target object located within a field of view area of the at least one camera, and which target object is located in the same location wherein the virtual tour data was captured and to transmit the captured image data to the data processing unit; and wherein the data processing unit is further configured to overlay the real-time image data on an area of the virtual tour view for forming a mixed image virtual tour data, which area of the virtual tour view corresponds the field of view area.

According to an embodiment, the system further comprises an audio sensor configured to capture real-time acoustic data in the location and to transmit the captured acoustic data to the data processing unit to be played in an area of the mixed image virtual tour view corresponding the location of the audio sensor or its surroundings in a real environment. According to an embodiment, the data processing unit is further configured to obtain additional information about the location and overlay the additional information on the mixed image virtual tour view. According to an embodiment, the system comprises more than one cameras. According to an embodiment, a time point of a view of the mixed image virtual tour is changeable to a previous time point.

According to a third aspect of the disclosed embodiments, there is provided a computer program product, stored on a computer readable medium and executable in a computing device, wherein the computer program product comprises instructions to perform the method according to the first aspects and its embodiments.

DESCRIPTION OF THE DRAWINGS

In the following, the aspects of the disclosed embodiments will be described in more detail with reference to the appended drawings, in which.

DETAILED DESCRIPTION

Figure 1A:
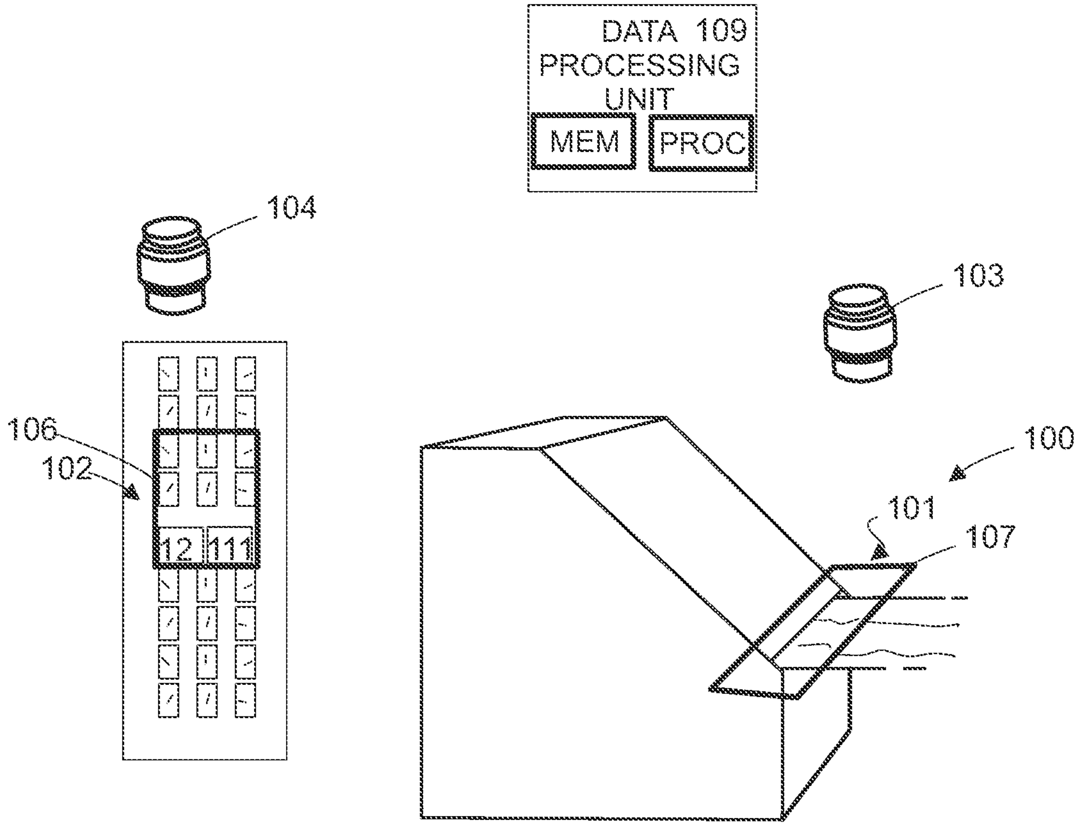
FIGS. 1*a-d* show an example embodiment of the present disclosure, in which a mixed image virtual tour of a paper machinery environment is formed from a static virtual tour data of the paper machinery environment and at least one live video stream from the paper machinery environment.

A virtual tour is a simulation of an existing location, for example, machinery environment, usually composed of image data, for example, a sequence of videos or still images. It may also combine other multimedia elements such as sound effects, music, narration, and text in the image data. Herein the term "virtual tour" comprises static virtual tours or static 3D virtual tours created/constructed using images data from still cameras or video cameras. Static 3D virtual tours can be created using 3D reconstruction.

Static virtual tours may be made of a number of static images captured from a single imaging point, when the camera and lens are rotated around an imaging point, or from a number of static adjacent images captured as a tour progresses i.e. when an imager walks through the location, after which those adjacent images are combined to one virtual tour image. Virtual tour created using video cameras are linear walk-throughs in locations. The location may be imaged for a virtual tour, for example, at a walking pace while moving continuously through the location. The videos may be captured, for example, every few meters, for example, every 3 meters. These cameras usually stores video data with distance information. Distance measurements may be performed, for example, with a laser or lidar. This distance information may then be used to build a 3D model of the location. The benefit of using this walk-through method for capturing a virtual tour data compared to the virtual tour taken from a single imaging point is that the point of view changes constantly as a tour progresses and the person watching the virtual tour gets much more information of the location, especially when the location is large. However, capturing of a walk-trough virtual tour requires that a person or other moving solution walks or moves through a location. And in order to get a real-time information from virtual tours, there is a need that a person or other moving solution walks or moves through a location constantly. But the problem of real-time virtual tours is that it is not always possible to have a person to walk through a location due to its geographical location or due to, for example, hazardous process or machine environment, or some another moving solution, for example, an autonomous mobile robot moving through the location, due to height differences in floor plans or other obstacles in the location. In addition to that, even if an autonomous mobile robot moves through a location and images the surroundings of the location on its way, will the first captured image and its information be aged, e.g. measuring results, when the robot reaches the end of its tour. This means that measuring results at the beginning of the tour and at end of the tour are not measured at the same moment, which means that even if they have some kind of synergistic effect, it cannot be seen.

As explained above, virtual tours and virtual tour data used in the present disclosure are static and they comprise image data, for example, video images, which are usually captured at a certain time point or points in the past i.e. in history at a location. The idea of the present disclosure is to augment a static virtual tour by overlaying at least one or more live image streams of imaging point(s) i.e. spot(s) of the location onto one or more views of the virtual tour in order to provide an augmented virtual tour i.e. mixed image virtual tour. This kind of augmented virtual tour is more intuitive user experience and also provides up-to-date information with real-time image data for a person remotely monitors that location of the mixed image virtual tour. A camera captures this real-time (live) image data of a certain target object and camera's field of view is configured to replace the corresponding area in a view of the static virtual tour so that this area of view comprises real-time image when a user watches the mixed image virtual tour. Thus, the virtual tour image data provides a kind of frame structure for real-time image data and real-time image data is overlayed on the view(s) of the virtual tour. Real-time image data may be, for example, real-time video image data i.e. real-time video stream or frequently captured real-time still images. For example, a virtual tour has been imaged in a machine environment, for example, 1 month ago, certain area(s) of view(s) of the virtual tour will be replaced by real-time image data of the same area(s) by superimposing i.e. overlaying, for example, a real-time video stream on the view(s) of the static virtual tour so that an augmented mixed image virtual tour is formed. It is also possible to use frequently captured real-time still images instead of real-time video stream for augmenting the virtual tour. And as a more specific application example, an area of a measuring device display in a measuring device view in that 1 month ago captured virtual tour may be replaced by real-time image data of the same area of measuring device display. Thus, when a user moves along the augmented mixed image virtual tour of the machine environment, the measuring device will show the current, real-time, situation in corresponding places in the augmented mixed image virtual tour as in the real machine environment. Thus in the augmented mixed image virtual tour the user can perform a tour corresponding more a real measuring device monitoring tour in the machine environment, but now the monitoring tour is done virtually and measuring readings of the measuring device are still up to date. In this mixed image virtual tour can the readings of the measuring devices then be analysed visually. The number of real-time video streams overlayed in one view of a video tour may depend on a number of cameras capturing image data of the area shown in the view.

The capturing of image data of a virtual tour may be performed by any suitable camera supported by a platform, for example, a wheeled platform structure, or a mobile robotic camera, an autonomous monitoring robot system, a camera supported and used by a person, or by any other suitable camera means. Term “camera” includes in this context any image sensor suitable for capturing images and/or video i.e. image data for a virtual tour, for example, a regular or smart camera, video camera, or any other suitable camera. The images/videos may be constructed by a data processing unit, for example, a server, or by any known computing means to a virtual tour form using any known methods of constructing virtual tours. The data processing unit may be a separate device receiving image data directly from a camera capturing the image data of the virtual tour, or it may receive images, for example, from a memory or cloud or another device. It is also possible that the virtual tour data is obtained, for example, from a memory, cloud storage or other device as a ready-made.

Real-time video image data or frequently captured real-time still images i.e. real-time image data configured to be added to the virtual tour may be captured by any suitable camera type described above, for example, a stationary surveillance camera may be aimed to desired target. The real-time image data may be transmitted to the data processing unit and the data processing unit may overlay the real-time image data on a virtual tour view i.e. it combines real-time image data with the virtual tour data in order to provide a mixed image virtual tour. After this, the mixed image virtual tour may be shown/displayed or it may be transmitted for a user to be viewed/displayed, which user even a distance from the machine environment, can monitor the machine environment by moving in the mixed image data virtual tour.

Unlike augmented realty (AR), which shows real-time environment and overlays part(s) of it by digital information and, for example, by previously captured images, the augmented mixed image virtual tour of the present disclosure shows previously captured virtual tour of a location or an environment, e.g. 360 degrees virtual tour, and superimposes i.e. overlays area(s) of it by real-time images or videos of corresponding area(s), for example, of measuring results of mechanical components, valves, belts or other equipment or other process measurements so that real-time image data is shown on top of view(s) of the static virtual tour and in places corresponding the places where they would be seen in the real-world location and environment.

FIGS. 1*a*-1*d* show an example embodiment of the disclosure, in which a mixed image virtual tour of a paper machinery environment 100 is formed from image data of a static virtual tour of the paper machinery environment 100 and at least one real-time video stream of target objects 101, 102 from the paper machinery environment 100. FIG. 1*a* shows two cameras 103, 104 each comprising an image sensor. The cameras 103, 104 are configured to image i.e. capture real-time image data, which in this example is a real-time video stream. The first camera 103 is arranged to capture a real-time video stream from a first target object, which in this embodiment is a wet end 101 of a paper machine. The second camera 104 is arranged to image a real-time video stream from a second target object, which in this embodiment is an area of a device 102 displaying measuring results of 8 measuring devices measuring different data of the machine environment or the paper machine itself. The first and second field of view areas 107, 106 of the cameras 103, 104 are shown by rectangles. The first and second field of view areas 107, 106 comprise the first and second target objects 101, 102, correspondingly.

The cameras 103, 104 comprise data transferring means, for example, a transmitter or a transceiver, for transmitting real-time video image data wirelessly or via wired connection from the cameras 103, 104 to a data processing unit 109. The data processing unit 109 comprises at least one processor, at least one memory including computer program code for one or more program units and means for receiving real-time video image data wirelessly or via wired connection from the cameras 103, 104, for example, a receiver or a transceiver. There may be multiple processors e.g. a general purpose processor, a graphics processor and/or a DSP processor and/or multiple different memories e.g. volatile memory for storing data and programs at run-time and non-volatile memory such as a hard disk for permanently storing data and programs. The data processing unit 109 may be any computing device suitable for handling and processing image data such as a computer. The data processing unit 109 may be in electronic communication with the cameras 103, 104 via signal lines. The data processing unit 109 may also include a video controller and an audio controller for generating signals that can be produced for the user with computer accessories. The data processing unit 109 may produce output to the user through output means. The video controller may be connected to a display (not shown). The display may be e.g. a flat panel display, a tablet, a display of a laptop or a projector for producing a larger image. The audio controller may be connected to a sound source, such as loudspeakers or earphones. The cameras 103, 104 may also include an acoustic sensor such as a microphone.

The data processing unit 109 is configured to receive real-time video image data from the cameras 103, 104 and to overlay at least one position/area of a view of the static virtual tour comprising corresponding areas as the one that camera 103, 104 imaged by the above-mentioned real-time video image data on. The data processing unit 109 may have received image data of this static virtual tour from a camera that imaged it and the data processing unit 109 may have constructed the virtual tour from this image data, or the data processing unit 109 may have received the virtual tour as ready-constructed, for example, from another computing device, from a memory or cloud storage.

It is also possible that instead of two cameras 103, 104 as in this example embodiment, there is only one camera arranged to image a real-time video stream or that there are more than two cameras arranged to image a real-time video streams, for example, 3-10, or even more, from different parts of the paper machinery environment.

Figure 1B:
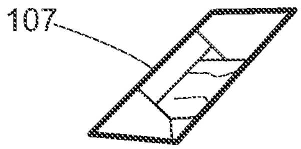

FIG. 1*b* shows as an example the first field of view area 107 configured to be overlayed i.e. superimposed on the corresponding area of a previously imaged static virtual tour of the paper machinery environment 100. Pulp fed onto a wire is shown in the first field of view area 107. The real-time video image data of the second field of view area 106 may also be superimposed onto an area of a view of the virtual tour corresponding the area of the second field of view area 106, even if not shown in this example.

Figure 1C:
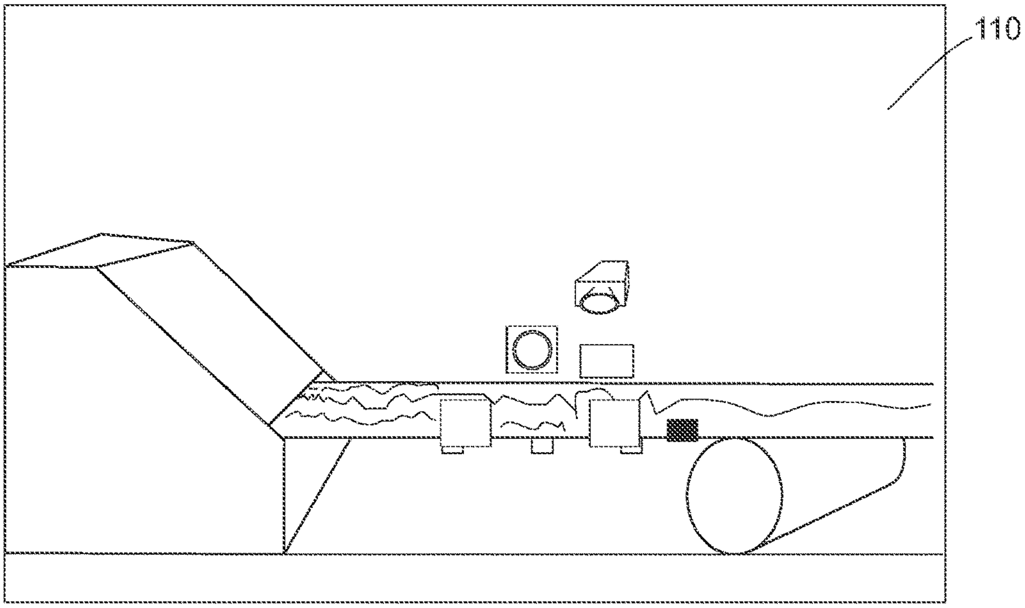

FIG. 1*c* shows a wet end view 110 of the virtual tour of the paper machinery environment 100. This view 110 comprises the same target object 101 as the first field of view area 107 i.e. the wet end 101 of the paper machine.

Figure 1D:
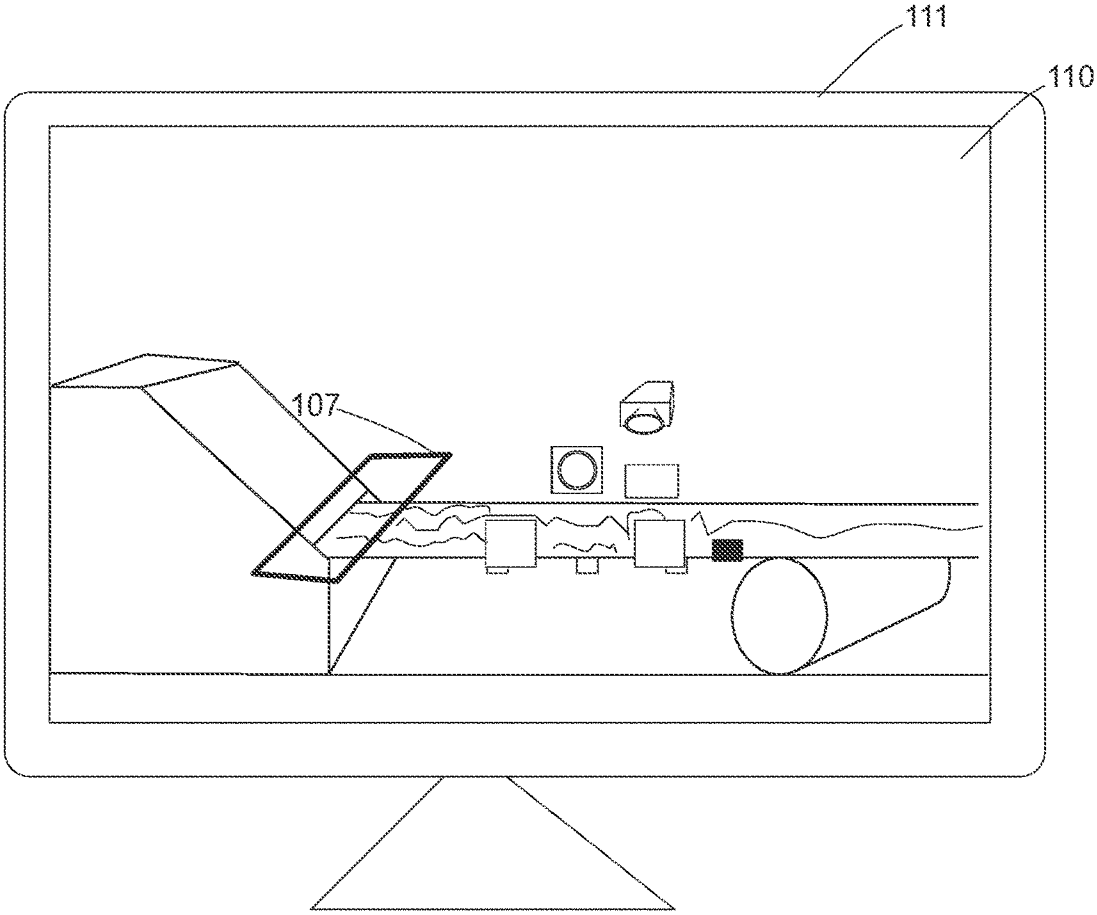

FIG. 1*d* shows a plan view of a user terminal 111 presenting the view 110 of the static virtual tour as a view of the mixed image virtual tour of the paper machinery environment 100. In this embodiment, the user terminal 111 is a monitor. In this view 110 of the mixed image virtual tour the first field of view area 107 is superimposed onto the corresponding area of the view 110 of the static virtual tour so that the view of the mixed image virtual tour is formed. As can be seen, the rest of the view 110 is old and static, but the area of the wet end 101 comprises real-time image data, which is updating in real-time. The form of the pulp on the wire is now different than it was when the virtual tour was captured.

Figure 2A:
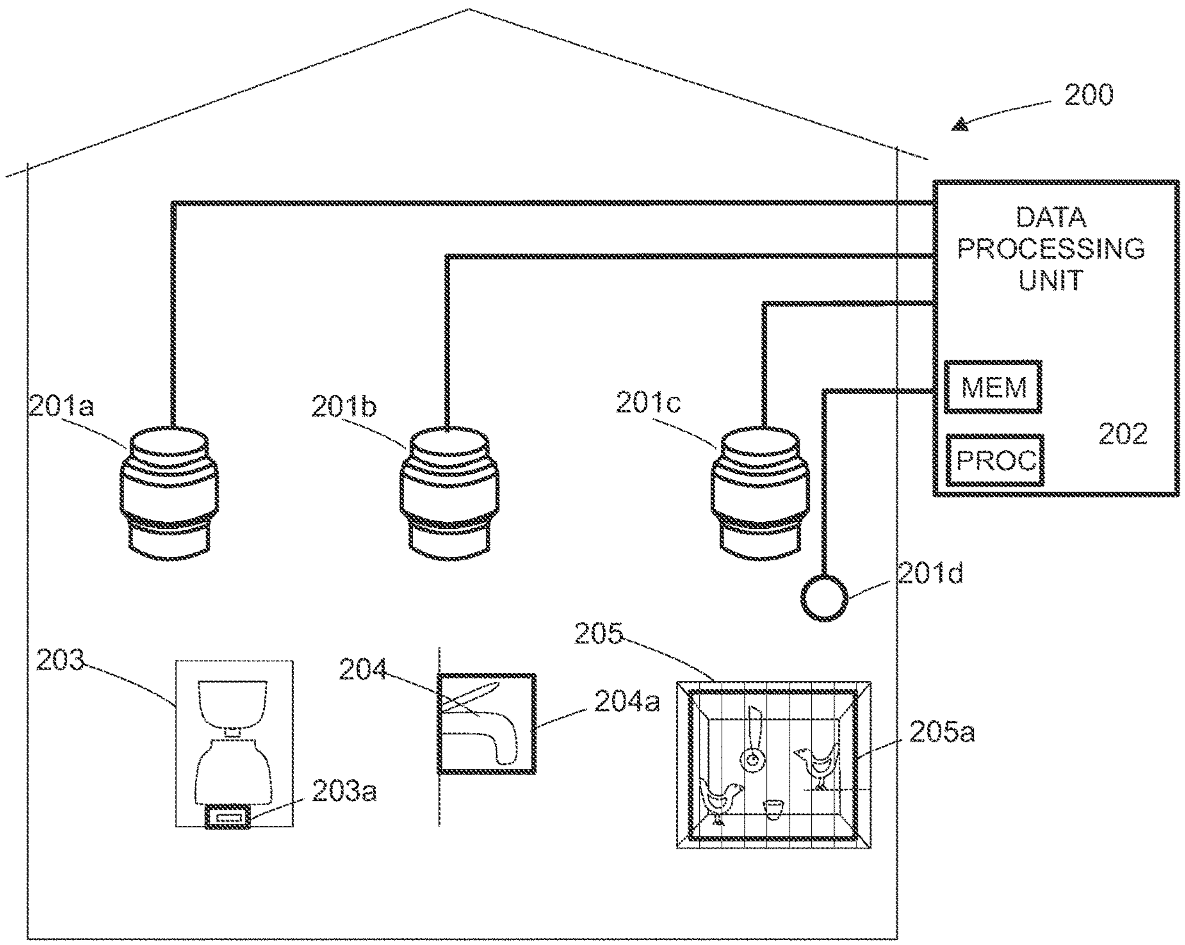
FIGS. 2*a-f* show an example of forming principle of a mixed image virtual tour of a house according to an embodiment of the present disclosure.

FIGS. 2*a*-2*f* show a forming principle of a mixed image virtual tour of a house 200 according to an example embodiment. The mixed image virtual tour of the house 200 is formed from a previously captured static virtual tour of the house 200 and two real-time video streams. FIG. 2*a* shows three cameras 201*a*, 201*b*, 201*c*, each comprising an image sensor. The cameras 201*a*, 201*b*, 201*c* are configured to image real-time image data, which in this example is real-time video stream. The first camera 201*a* is arranged to image a real-time video stream from a first target object, which in this embodiment is a switch of a coffee maker 203. The second camera 201*b* is arranged to image a real-time video stream from a second target object, which in this embodiment is a bathroom tap 204. And the third camera 201*c* is arranged to image a real-time video stream from a third target object, which in this embodiment is a bird cage 205. Field of view areas 203*a*, 204*a*, 205*a* of the first, second and third cameras 201*a*, 201*b*, 201*c* are shown by rectangles, correspondingly. Each field of view area 203*a*, 204*a*, 205*a* comprises target objects 203, 204, 205, correspondingly. In this embodiment, there is also a microphone 201*d*. The microphone 201*d* is arranged in the proximity of the bird cage 205 so that it is capable to capture audio signal i.e. acoustic data produced by the birds in the cage 203.

The cameras 201*a*, 201*b*, 201*c* comprise data transferring means, for example, a transmitter or a transceiver, for transmitting real-time video image data wirelessly or via wired connection from the cameras 201*a*, 201*b*, 201*c* to a data processing unit 202. The data processing unit 202 may be, for example, a server. The data processing unit 202 comprises at least one processor, at least one memory including computer program code for one or more program units and means for receiving real-time video image data wirelessly or via wired connection from the cameras 201*a*, 201*b*, 201*c* and acoustic data from the microphone 201*d*, for example, a receiver or a transceiver. There may be multiple processors e.g. a general purpose processor, a graphics processor and/or a DSP processor and/or multiple different memories e.g. volatile memory for storing data and programs at run-time and non-volatile memory such as a hard disk for permanently storing data and programs. The data processing unit 202 may be any computing device suitable for handling/processing image and audio data such as a computer. The data processing unit 202 may be in electronic communication with the cameras 201*a*, 201*b*, 201*c* and the microphone 201*d* via signal lines. The data processing unit 202 may also include a video controller and an audio controller for generating signals that can be produced for the user with computer accessories. The data processing unit 202 may produce output to the user through its output means. The video controller may be connected to a display (not shown). The display may be e.g. a flat panel display, a display of a laptop or a projector for producing a larger image. The audio controller may be connected to a sound source, such as loudspeakers or earphones. Physically the data processing unit 202 may locate in the house 200 or outside the house 200. It is also possible that the cameras 201*a*, 201*b*, 201*c* and the microphone 201*d* transfer their data to a cloud storage, wherefrom the data processing unit 202 may retrieve the data.

The data processing unit 202 is configured to receive real-time video image data from the cameras 201*a*, 201*b*, 201*c* and audio signal from the microphone 201*d* or from the cloud storage, and to add the above-mentioned real-time video image data to a suitable view of the static virtual tour comprising corresponding areas as cameras 201*a*, 201*b*, 201*c* imaged and to add audio signal to a suitable position of a view of the static virtual tour corresponding position as where the microphone 201*d* is located or to position of the view of the static virtual tour where the audio signals captured by the microphone 201*d* would be heard in real-world situation.

Again the number of cameras and/or microphones capturing real-time data can be different. Also the number of cameras and/or microphones, which data is added to the mixed image virtual tour can vary as needed or desired. The cameras 201*a*, 201*b*, 201*c* may also include an acoustic sensor such as a microphone.

Figure 2B:
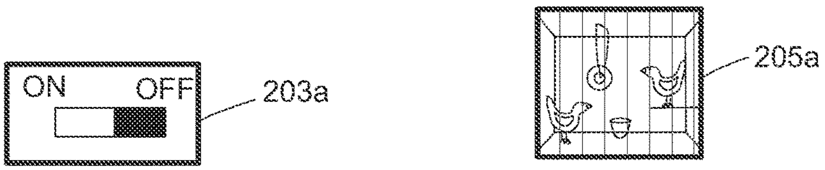

FIG. 2*b* shows as an example the first field of view area 203*a* of the coffee maker switch configured to be superimposed on corresponding area of a kitchen view 210 of a previously imaged static virtual tour of the house 200. It can be seen from the first field of view area 203*a* that the switch is now OFF. The second field of view area 204*a* of the bathroom tap 204 is not shown in this FIG. 2*b*, but it is possible that it is also configured to be superimposed on corresponding area of a bathroom view of the virtual tour of the house 200. FIG. 2*b* also shows the third field of view area 205*a* of the bird cage 205 configured to be superimposed on corresponding area of a living room view of the static virtual tour of the house 200. It can be seen from the third field of view area 205*a* the current situation of the birds in the cage 205.

Figure 2C:
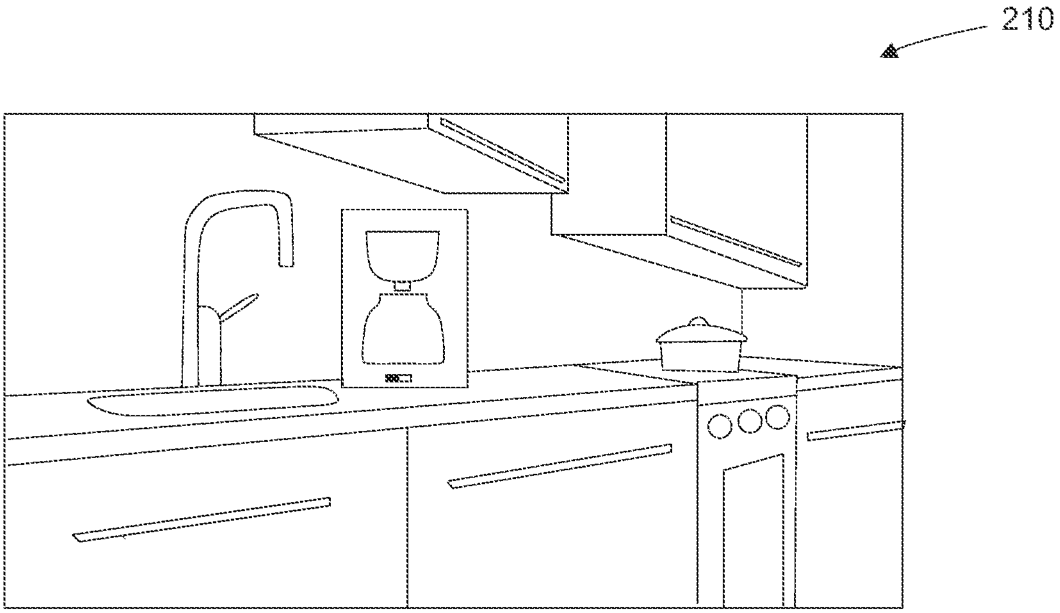

FIG. 2*c* shows the kitchen view 210 of the virtual tour of the house 200. This view 210 shows the first target object i.e. coffee maker switch configured to be replaced by the first field of view area 203*a*, the switch is ON.

Figure 2D:
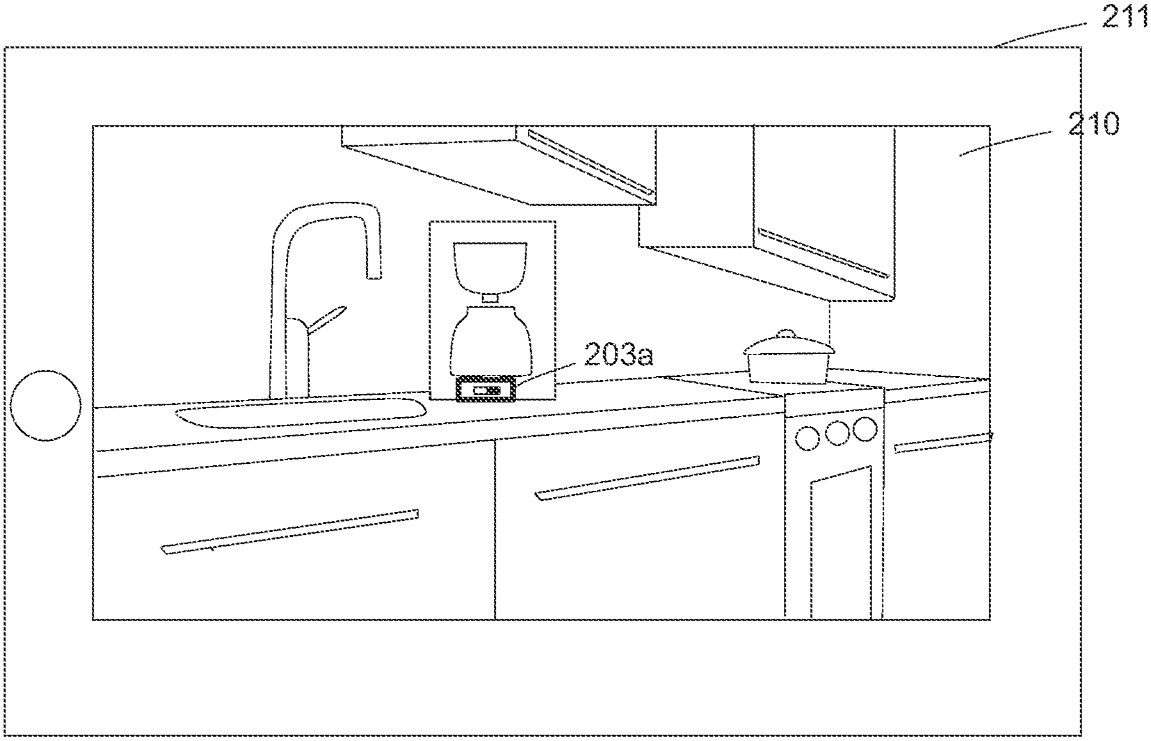

FIG. 2*d* shows the kitchen view 210 on a user terminal 211 that is a hand hold device, for example, a tablet presenting the kitchen view 210 of the mixed image virtual tour. In this view 210 the first field of view area 203*a* i.e. the coffee maker switch area is superimposed i.e. overlayed on to the corresponding area of the kitchen view 210. As can be seen, the rest of the view 210 is old and static, but the coffeemaker switch area comprises live data and it is updated in real-time and it can be seen that it is in different state than it was, when the kitchen view 210 of the virtual tour was captured.

Figure 2E:
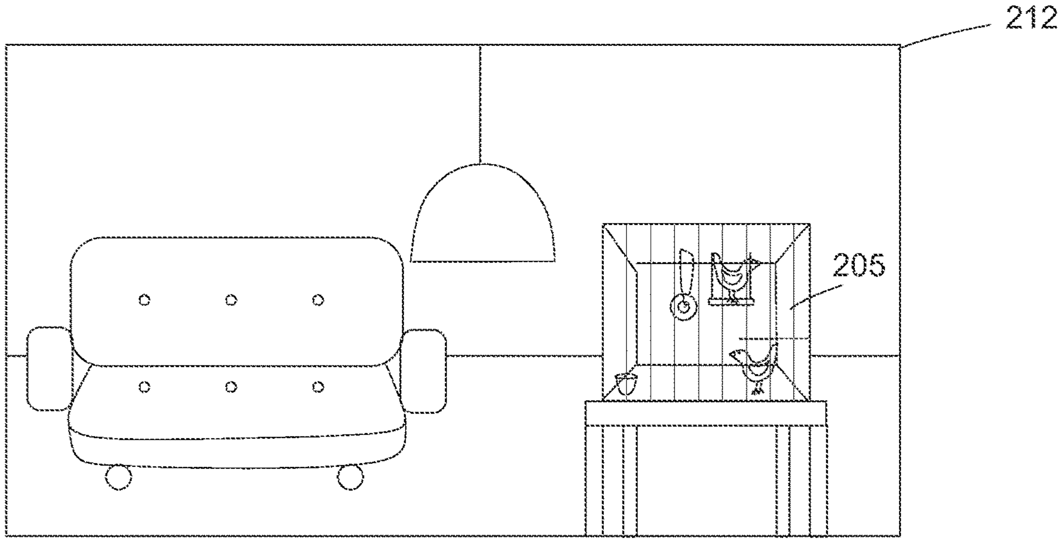

FIG. 2*e* shows the living room view 212 of the virtual tour of the house 200. This view 212 shows the third target object i.e. the bird cage 205 configured to be replaced by the third field of view area 205*a* in the mixed image virtual tour.

Figure 2F:
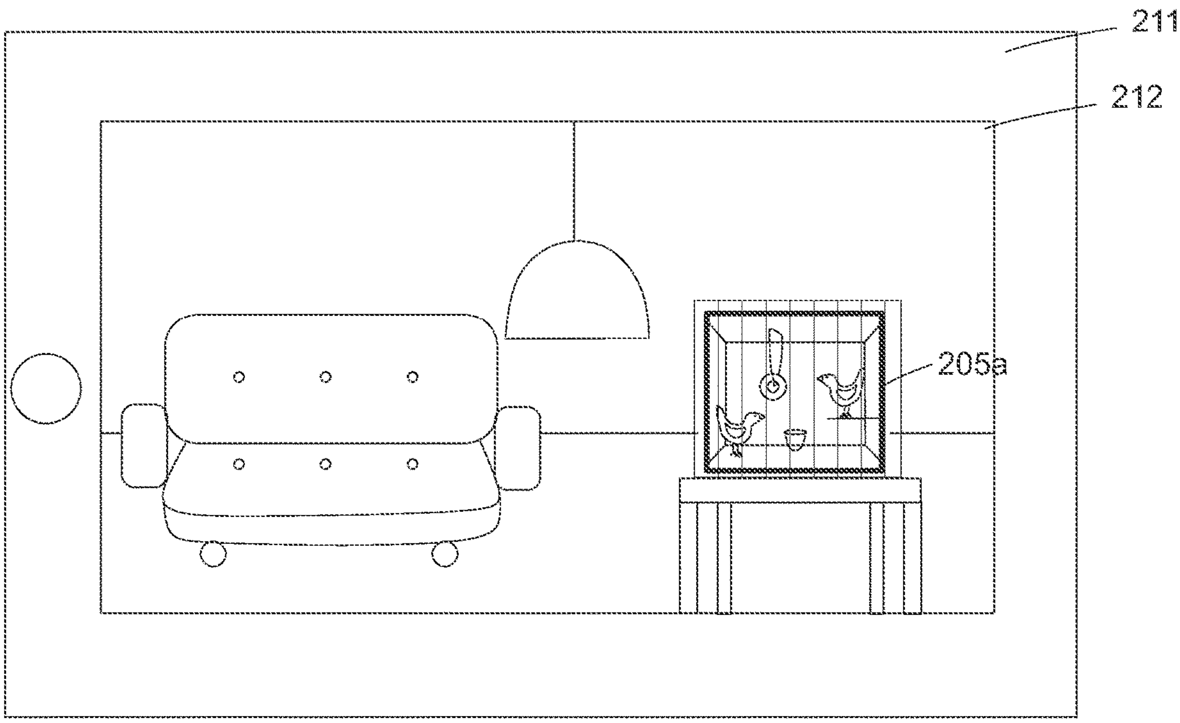

FIG. 2*f* shows the living room view 212 on the user terminal 211. In this view 212 the third field of view area 205*a* i.e. the bird cage area is superimposed on to the corresponding area of the living room view 212 of the virtual tour. As can be seen, the birds are positioned differently in this augmented view as they were when the living room view 212 of the virtual tour was imaged.

The audio signal captured by the microphone 201*d* may also be configured to be played when the user enters the living room in the mixed image virtual tour. It is also possible that the audio signal captured by the microphone 201*d* is configured to be played when the user exceeds a certain predetermined distance from the bird cage when entering the living room in the mixed image virtual tour and stopped when the user exceeds a second certain predetermined distance from the bird cage when leaving the living room in the mixed image virtual tour.

The replaced area(s) in a view or views of a mixed image virtual tour i.e. areas(s), wherein real-time image data is superimposed on view(s) of a static virtual tour may be indicated so that the user can more easily detect, which part(s) of the mixed image virtual tour are real-time data and which not. The indication may be done, for example, by framing the replaced area with color or lighting, which could flash or not, or using brighter lighting in the replaced area or by slightly blurring surroundings of the real-time area.

FIGS. 3*a*-3*d* show an example embodiment of the present disclosure, in which these two different views of a mixed image virtual tour of a paper machinery environment, wherein overlayed image data i.e. video streams is captured in two different time points. In these FIGS. 3*a-d*, views 110, 310 of a previously captured static virtual tour of the paper machinery environment and video streams overlaying on certain areas of these views are disclosed.

Figure 3A:
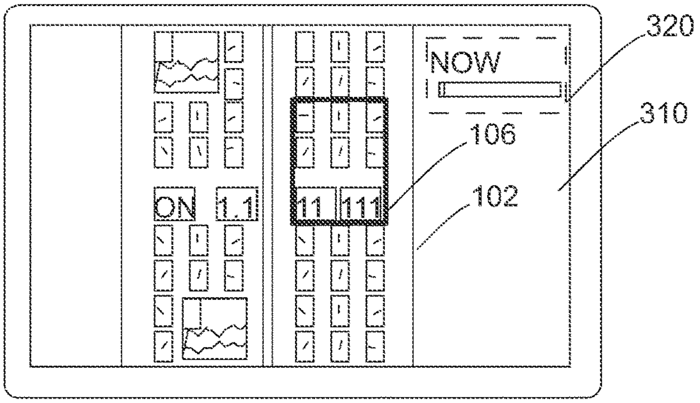
FIGS. 3*a*-3*d* show an example embodiment of the present disclosure, in which two different views of a mixed image virtual tour of a paper machinery environment are shown in two different time points.

FIG. 3*a* shows a monitoring room view of the mixed image virtual tour, wherein two devices displaying measuring results are shown. A real-time video stream from a target object, which in this image is the same area of a device 102 displaying measuring results as in the FIG. 1*a*, is captured by a video camera. And the field of view area 106 of the camera is again overlayed on the view 310 of the previously captured static virtual tour and to the corresponding place where this area of the device 102 displaying measuring results is in the real paper machinery environment and in monitoring room view 310 of the previously captured static virtual tour. The time point of this view of the mixed image virtual tour is indicated by a time indicator 320 on top of the view, but it is also possible to display this time indicator 320 by some other way. As can be seen, the time point, when shown and overlayed image data is captured, corresponds the present moment, now, and the data superimposed onto the view 310 of the previously captured static virtual tour is real-time image data.

Figure 3B:
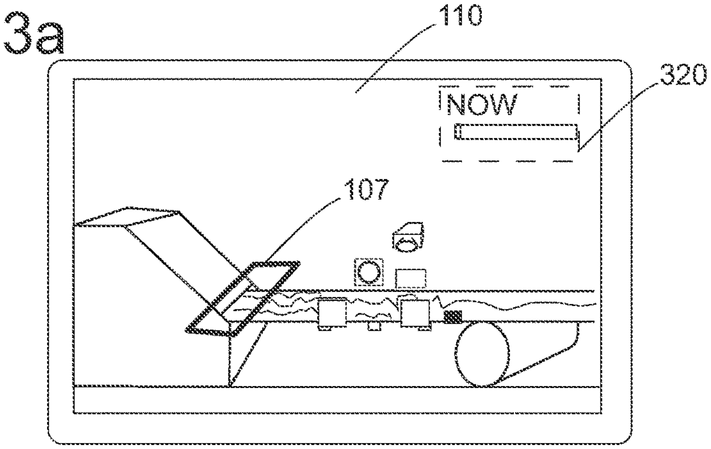

FIG. 3*b* shows the wet end view of the mixed image virtual tour, wherein pulp fed to the wire is shown. A real-time video stream from a target object, which in this image is the same wet end area as in the FIG. 1*a*, is captured by a second video camera. And field of view area 107 of the camera is again overlayed on the view 310 of the previously captured static virtual tour and to the corresponding place where this area of the wet end is in the real paper machinery environment and in wet end view 110 of the previously captured static virtual tour. The time point when the image data of this view of the mixed image virtual tour was captured by the second video camera is again indicated by the time indicator 320 on top of the view. As can be seen, the time point again corresponds the present moment, now, and the data superimposed onto the view 110 of the previously captured static virtual tour is real-time image data.

But according to example of the present disclosure, it is possible to change a time point of the mixed image virtual tour backwards, i.e. to change the time point of overlayed image data displayed in the views of the mixed image virtual tour to a time point earlier than the present time point. The earlier time point may then be the same in all views of the mixed image data virtual tour. These earlier time point views of the mixed image virtual tour will then show the views of the previously captured static virtual tour and image data captured at that same earlier time point. This type of presentation would not be possible in a case of an ordinary virtual tour, because the imaging device that captured or will captured the image data for the virtual tour cannot capture the data so that image capturing time is exactly the same in all views. And this capability of showing simultaneously captured information in all views of the mixed image virtual tour, as has already been said above, may be necessary in determining the cause-and-effect relationships of damages and avoiding consequences of the damages.

Figure 3C:
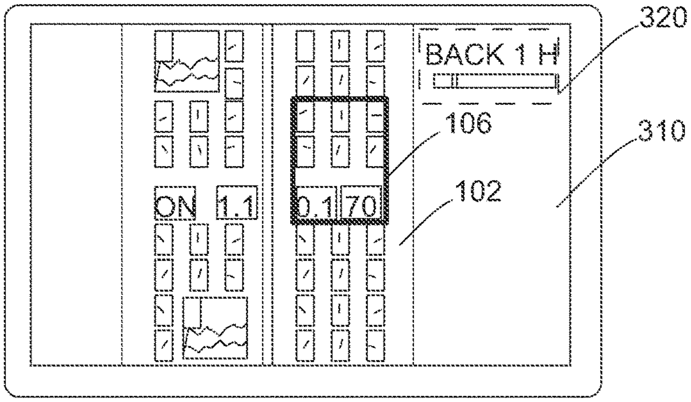
Figure 3D:
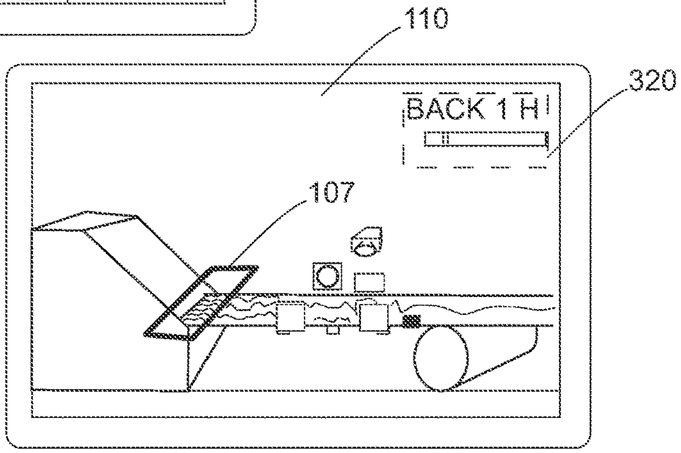

FIGS. 3*c* and 3*d* show the same monitoring room and wet end views of the mixed image virtual tour as FIGS. 3*a* and 3*b*, respectively, but at an earlier time point, an hour ago. Thus, the FIG. 3*c* shows the monitoring room view, wherein two devices displaying measuring results are shown. The field of view area 106 of the camera is again superimposed onto the view 310 of the previously captured static virtual tour. The time point of capturing overlayed image data of this monitoring room view of the mixed image virtual tour is indicated by the time indicator 320. The image data overlayed on the view 310 of the previously captured static virtual tour corresponds video image data captured at that indicated time point of the area of the device 102 displaying measuring results of 8 measuring devices measuring different data of the machine environment or the paper machine itself. And the FIG. 3*d* shows the wet end view. The field of view area 107 of the camera is again overlayed on the view 310 of the previously captured static virtual tour. The time point of this wet end view of the mixed image virtual tour is again indicated by the time indicator 320. The image data overlayed on the view 110 of the previously captured static virtual tour corresponds video image data captured at that indicated time point of the wet end of a paper machine and indicated by the time indicator 320.

As can be seen, there are differences in the measurement results in the field of view area 106 of the monitoring room view and in the pulp in the field of view areas 107 of the wet end view between the different time points, whereas the rest of the views of the mixed image virtual tour have remained the same.

Change of the time points of the views to be displayed can be determined, for example, by moving a square part on the horizontal axis of the time indicator 320 or by any other way. It should be noted that it is predetermined that at the selected time point all data shown overlaying on the views of the mixed image virtual tour have been captured at that same selected time point. In other words, if the user selects to see a mixed image virtual tour captured 10 minutes ago, images overlaying on all of the views are captured 10 minutes ago, whereas in the real-time view all data including images or image streams overlaying on all of the views are real-time image data. However, it is also possible, that time point can be selected so that at least one view shows image data captured at a different time point compared to image data overlaying on other views of the mixed image virtual tour.

Figure 4:
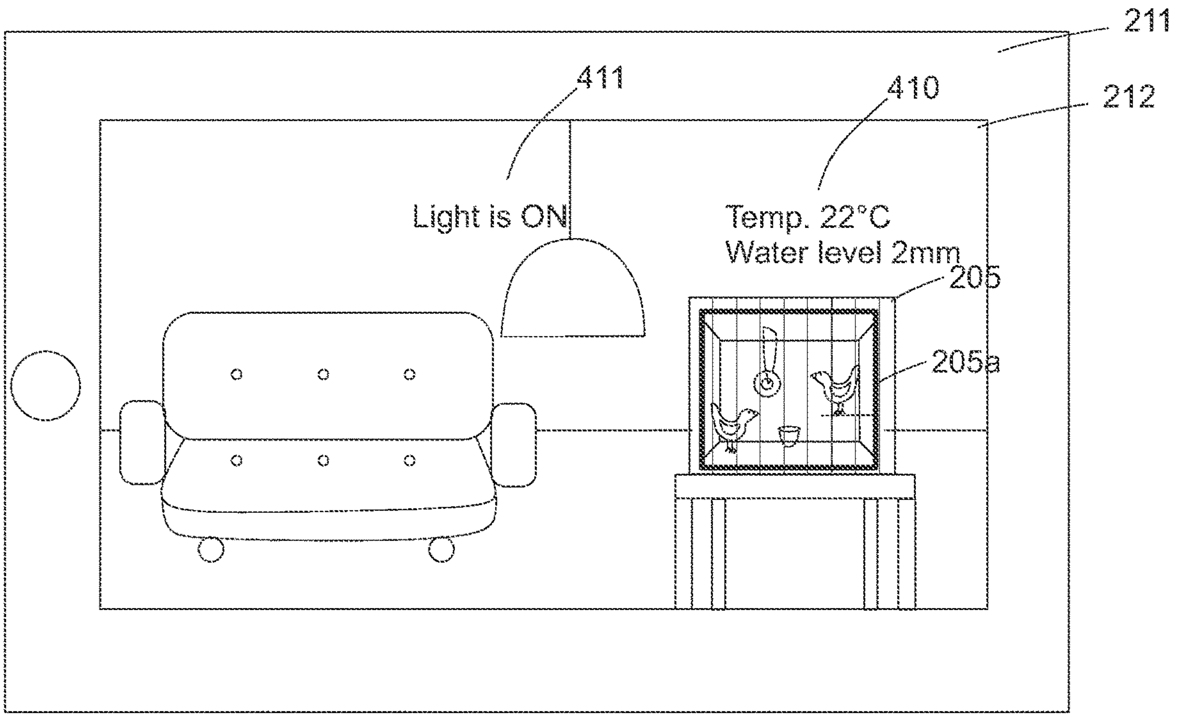
FIG. 4 shows an example embodiment of the present disclosure, in which an additional information is overlayed on a mixed image virtual tour view of a house environment.

FIG. 4 shows the same living room view 212 on the user terminal 211 as the FIG. 2*f*. In this view 212, the field of view area of the bird cage 205*a* of real-time video image data is overlayed on the corresponding area of the living room view 212 of the previously captured virtual tour so that an augmented virtual tour i.e. mixed image virtual tour is formed by a data processing unit. However, in this FIG. 4, in addition to real-time image data, also additional information is overlayed on the living room view 212. The additional information, which may be shown in views of the mixed image virtual tour may be, for example, any information relating to the environment of the view or other parts of the virtual tour. In this figure, a first additional information 410 relates to the bird cage shown in the field of view area of the bird cage 205*a*. The first additional information 410 indicates a temperature around the bird cage 205 and also water level of a water bowl inside the bird cage 205. The second additional information 411 relates to a lighting device i.e. a ceiling hanging lamp and it indicates that the lamp is on.

Additional information shown in FIG. 4 are just examples. The additional information may also relate, for example, to sensor readings or measuring results shown in a field of view area or other information relating, for example, to those measuring results. Sensor readings or measuring results may be captured by sensors within the location, for example, sensors of the machines and/or sensors of other connected devices. In some cases, additional information is indicative of sensor data captured that pertain to structures, devices, or other objects in the location. The additional information may be shown, for example, next to the field of view area, under it or on top of it, or in any other place on top of the view of the mixed image virtual tour. The additional information may also be captured simultaneously with image data overlaying on a view or it may be history data, but it is also possible that additional information data is gathered around the time point in which time point image data overlaying on a view of a mixed image virtual tour is captured, for example, 1 min before and other. Alternatively, any other time period instead of 1 min may be used. The time period may depend on, for example, the additional information or a user may configure the time period.

A data processing unit may obtain additional information about the location or environment, for example, from above mentioned sensors or measuring devices and overlay the additional information on a mixed virtual tour data.

Figure 5:
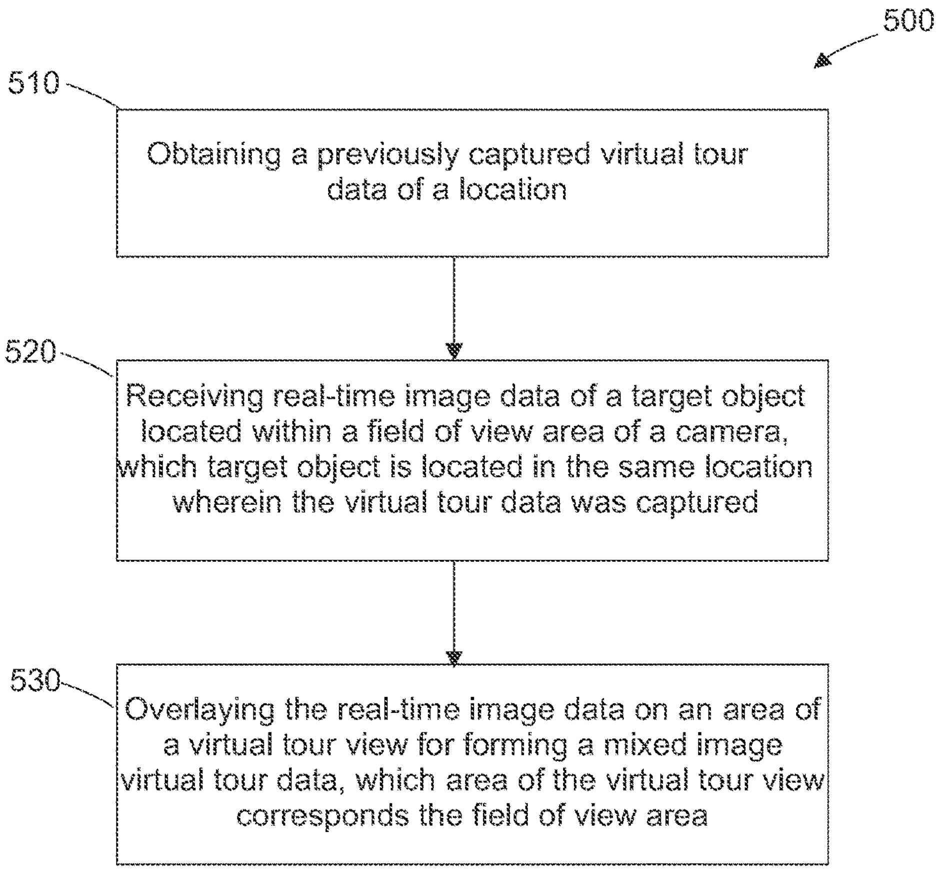
FIG. 5 shows an example embodiment of the present disclosure, in which a block diagram of a computer implemented method for augmenting a virtual tour to a mixed image virtual tour is disclosed.

FIG. 5 shows a flow chart of a computer implemented method 500 for augmenting a virtual tour to a mixed image virtual tour. In step 510, a previously captured virtual tour data of a location is obtained. In step 520, real-time image data of a target object located within a field of view area of a camera, which target object is located in the same location wherein the virtual tour data was captured is received and in step 530, the real-time image data is overlayed on i.e. shown on an area of a virtual tour view for forming a mixed image virtual tour data, which area of the virtual tour view corresponds the field of view area.

Figure 6:
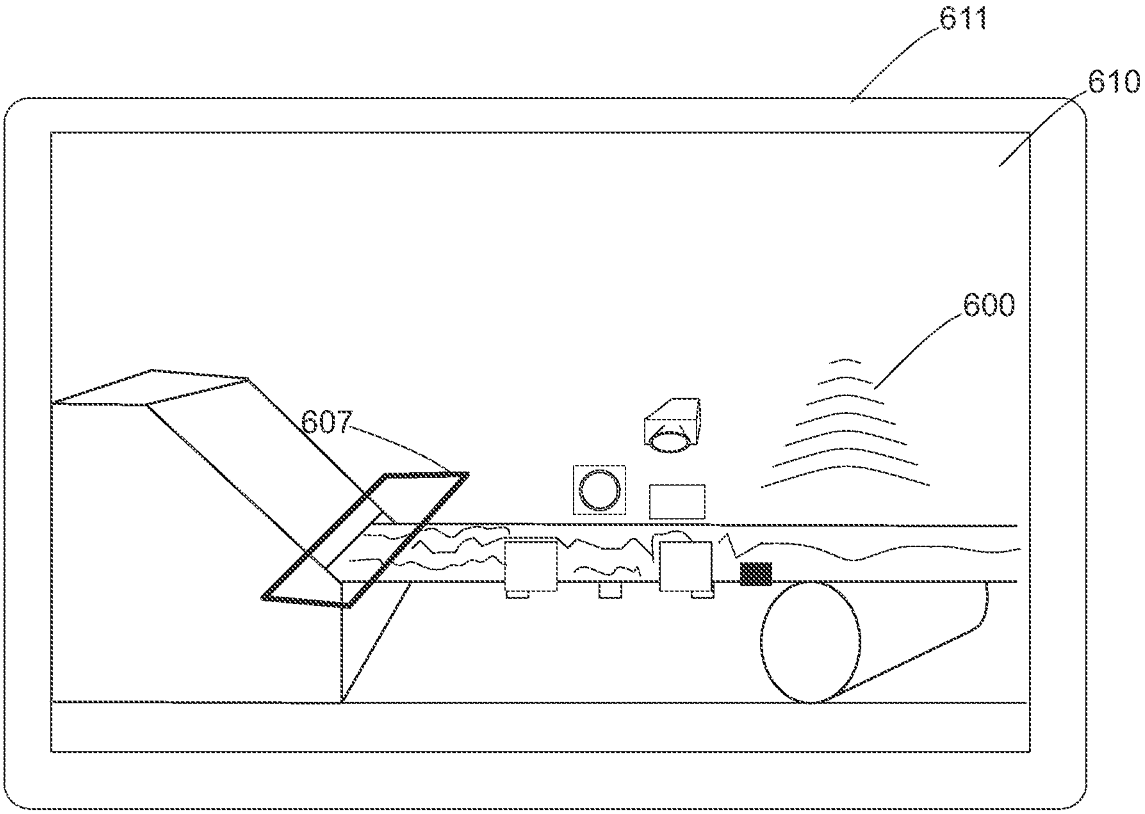
FIG. 6 shows an example of a plan view of a user terminal 611 presenting a wet end view of a mixed image virtual tour of a paper machinery environment.

FIG. 6 shows an example of a plan view of a user terminal 611 presenting a wet end view 610 of a mixed image virtual tour of a paper machinery environment. The wet end area of a paper machine is a target object in this example. In the paper machinery environment, there is a real-time video camera capturing real-time video stream of the wet end area. In this wet end view 610 of the mixed image virtual tour real-time video stream data of a field of view area 607 of the real-time video camera is superimposed onto the corresponding wet end area of the wet end view 610 of a static virtual tour so that the mixed image virtual tour is formed. But in this example, there is also an acoustic sensor such as a microphone in the wet end area of the paper machine.

The acoustic sensor is arranged to record environmental sound 600. That recorded environmental sound is 600 arranged to be transmitted as acoustic data to a data processing unit configured to construct the mixed virtual tour. The acoustic sensor comprises means for transmitting acoustic data to the data processing unit. The means for transmitting acoustic data may be, for example, a transceiver or a transmitter arranged to transmit acoustic data wirelessly or via a wired connection from the sensor to the data processing unit.

The data processing unit configured to construct the mixed virtual tour comprises at least one processor, at least one memory including computer program code for one or more program units and means for receiving acoustic data wirelessly or via a wired connection from the acoustic sensor. Means for receiving acoustic data may be, for example, a receiver or a transceiver. An example of the data processing unit is defined more precisely above in context with previous figures.

Thus the data processing unit is configured to receive acoustic data from the acoustic sensor that records environmental acoustic signal, convert acoustic signals into electrical acoustic data, and transmit the acoustic data to the data processing unit, which is arranged to play the acoustic data in the wet end view of the mixed image virtual tour corresponding the place in the real paper machinery environment, wherein the acoustic sensor is positioned. Thus, the mixed image virtual tour is further augmented by audio signal data in addition to real-time video stream data.

Audio sensor according to the disclosed embodiments capturing i.e. recording real-time acoustic data comprise at least circuitry and electronics for recording environmental acoustic sound i.e. data, converting acoustic data into electrical signals and transmitting this acoustic data. Cameras according to the disclosed embodiments comprise at least circuitry and electronics for capturing real-time images or video stream and transmitting image data.

It should be noted that the number of cameras arranged to provide real-time image data of target objects to be overlayed on views of a mixed image virtual tour may vary. There may be only one camera or there may be a plurality of cameras. Also the number of cameras, which image data is arranged to be overlayed on views of the mixed image virtual tour may also vary. There may be several cameras capturing image data of the target objects, but it is possible that only one, two etc. field of view areas are shown on top of the view. Also the shown image data of field of view areas or additional information may be changeable by a user, or it may depend, for example, on time of day, season, user profile, outdoor temperature, indoor temperature, humidity, etc. So that only the most relevant additional information is overlayed on the view.

It is obvious that the present disclosure is not limited solely to the above-presented embodiments, but it can be modified within the scope of the appended claims.

The invention claimed is:

1. A computer implemented method, comprising:

obtaining previously captured image data of a virtual tour of a location, receiving real-time image data of at least one target object located within a field of view area of a camera, wherein the at least one target object is located in the location represented by the previously captured image data, overlaying the real-time image data of the at least one target object on an area of the virtual tour corresponding to a location of the at least one target object in the virtual tour to form a mixed image virtual tour view, wherein the captured image data of the virtual tour remains visible around the overlayed real-time image data, receiving real-time acoustic data captured by an audio sensor in the location, playing the real-time acoustic data when a user moving along the mixed image virtual tour view exceeds a predetermined distance from a position of the at least one target object, wherein the acoustic data is captured by the audio sensor in real time, and wherein all overlayed image data of the at least one target object displayed in the mixed image virtual tour view are captured at a same selected time point to create a temporally consistent snapshot of the location.

2. The computer implemented method according to claim 1, wherein the previously captured image data is static image data of a real environment of the location.

3. The computer implemented method according to claim 1, wherein the previously captured image data comprises images captured by a moving platform moving through the location, and wherein the previously captured image data is obtained from a camera, a memory or a cloud storage, and wherein the method further comprises: constructing the previously captured image data as a virtual tour by a data processing unit.

4. The computer implemented method according to claim 1, wherein the previously captured image data is a ready-constructed virtual tour.

5. The computer implemented method according to claim 1, wherein the method further comprises:

obtaining additional information about the location, and overlaying the additional information on the mixed image virtual tour view.

6. The computer implemented method according to claim 1, wherein the real-time image data is a real-time video stream or frequently captured real-time images.

7. The computer implemented method according to claim 1, wherein the method further comprises:

capturing real-time image data configured to be overlayed on areas of the virtual tour view by more than one camera.

8. The computer implemented method according to claim 1, wherein a time point of views of the mixed image virtual tour view is changeable to a previous time point.

9. A computer program product, stored on a non-transitory computer readable medium and executable in a computing device, wherein the computer program product comprises instructions to perform the method according to claim 1.

10. A system comprising at least one camera and a data processing unit, wherein the data processing unit is configured to obtain previously captured image data of a virtual tour of a location and the at least one camera is configured to capture real-time image data of at least one target object located within a field of view area of the at least one camera, and wherein the at least one target object is located in a same location where the captured image data was captured, and to transmit the captured image data to the data processing unit, and wherein the data processing unit is further configured to overlay the real-time image data of the at least one target object on a corresponding area of the virtual tour view for forming a mixed image virtual tour view, wherein the captured image data of the virtual tour remains visible around the overlayed real-time image data, to receive real-time acoustic data captured by an audio sensor in the location, and to play the real-time acoustic data when the user moving through the mixed image virtual tour exceeds a predetermined distance from a position of the at least one target object, the acoustic data being captured by the audio sensor in real time, and all overlayed image data of the at least one target object displayed in the mixed image virtual tour view are captured at a same selected time point to create a temporally consistent snapshot of the location.

11. The system according to claim 10, wherein the data processing unit is further configured to obtain additional information about the location and overlay the additional information on the mixed image virtual tour view.

12. The system according to claim 10, wherein the system comprises more than one camera.

13. The system according to claim 10, wherein a time point of views of the mixed image virtual tour view is changeable to a previous time point.

* * * * *